July 10, 1928.  
F. E. HANSEN  
INFLATING VALVE  
Filed Dec. 26, 1924  
1,676,777
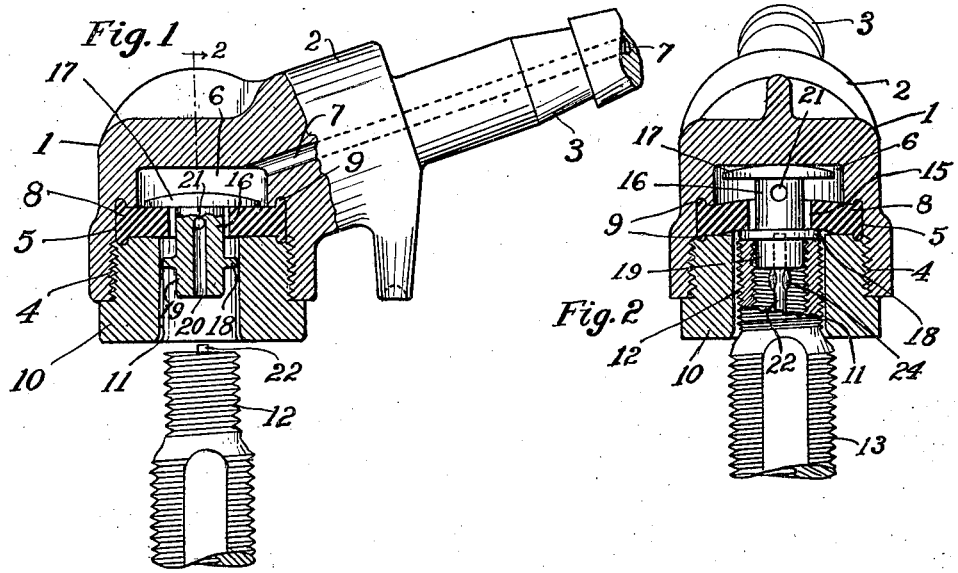
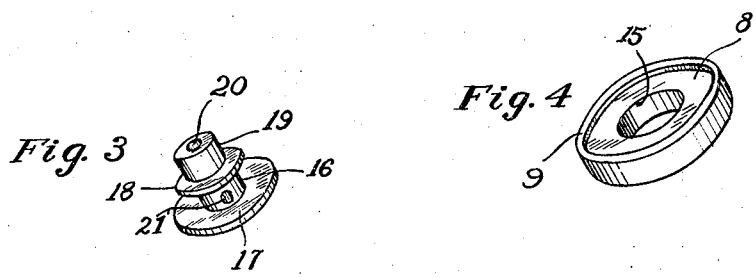
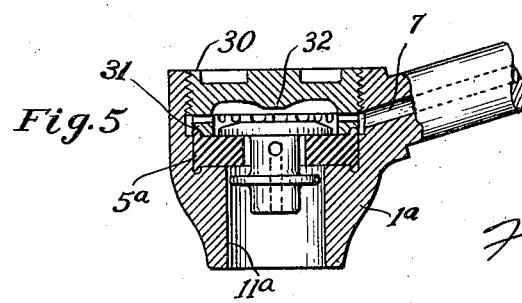
F. E. Hansen
INVENTOR
BY Smith & Freeman
ATTORNEYS Patented July 10, 1928.

1,676,777

UNITED STATES PATENT OFFICE.

FRED E. HANSEN, OF LAKEWOOD, OHIO, ASSIGNOR TO THE HANSEN MANUFACTURING COMPANY, OF CLEVELAND, OHIO, A CORPORATION OF OHIO.

INFLATING VALVE.

Application filed December 26, 1924. Serial No. 758,057.

This invention relates to inflating valves such as are used for inflating pneumatic tires, and has for its object the provision of a device of this character consisting of a minimum number of parts which parts shall be free from leakage of air and also free from injury by reason of wear. Valved pipe connections have long been known having provisions for opening a fluid passage upon the establishment of the desired connection and such have often been used for inflating pneumatic tires, but in practically all instances a rubber or soft packing has been so flexed, bent, compressed, rubbed, or otherwise mistreated as to become worn and useless after a comparatively short life. An important feature of my invention is the construction of the valve in such wise that the opening and closing movements of the same are effected without any substantial flexing, displacement, or wear of any soft packing, and without bringing such packing into contact with any inserted member, while at the same time being leakage free when not in use and substantially free from leakage while in use.

In the drawings accompanying and forming a part of this application I have shown certain illustrative embodiments of my inventive idea drawn to considerably enlarged scale. Fig. 1 is a longitudinal sectional view through a hose coupling embodying my improvements, showing the valve as seated and a tire valve in a position to enter the coupling; Fig. 2 is a sectional view of the parts corresponding to the line 22 of Fig. 1 showing the coupling as applied to the tire valve, and the air valve in open positions; Fig. 3 is a perspective view of the air valve; Fig. 4 is a perspective view of the packing member; and Fig. 5 shows a modified form of casing.

The body of the coupling consists of a casting having a head 1 and a neck 2, the latter carrying the nipple 3 to which a suitable air hose is attached. Formed in one side of the head is a threaded recess 4 which merges with a cylindrical counterbore 5 which in turn merges with a chamber 6, the chamber communicating with a duct 7 extending through the stem. Seated in the counterbore 5 is a flat circular washer 8 of soft rubber or some substance having the essential qualities of rubber. This washer is preferably formed at each margin with a lateral projecting rib 9 as shown, the counterbore being suitably recessed for the same; and threaded in the aperture 4 is a nut 10 which grips this washer tightly in leakage preventing relation. This nut is formed with an axial bore 11 of a size to receive snugly but slidably the reduced end 12 of the usual tire valve casing 13.

The diameter of the bore 11 is less than the diameter of the chamber 6 and the washer 8 is formed with a central aperture 15 still smaller than the bore 11 and mounted in this aperture is a valve member shown in perspective in Fig. 3. This member comprises a cylindrical shank 16 fitting loosely in the aperture 15, a head 17 at one end of said shank and having a flat face adjacent to said shank, the opposite side of the head being gradually rounded, and a circumferential flange 18 spaced from said head so as to underlie the portion of the washer immediately adjacent the aperture. Below this flange the valve is provided with an extension 19, preferably of slightly tapered form, adapted to enter the end of the tire valve. The length of the shank 16 is slightly greater than the thickness of the washer as shown in Fig. 1, thus facilitating the assembling of the parts since the valve member is applied to the washer like a collar button to a button hole; the flange 18 must be loose in the bore 11, although the upper end of the bore may, if desired, be flared or recessed slightly to receive the same; and the nipple 19 enters the tire valve casing 12 substantially in leak-proof relation, the end of the entering member being seated squarely against the outer face of the flange 18.

The shank 16 and its extension 19 are formed with a longitudinal passageway 20 which merges with one or more lateral ports 21 immediately beneath the head 17, this passageway 20 being of a size to receive freely the stem 22 of the valve member carried by the tire. This valve stem is customarily formed a short distance from its end with opposed wings 24 made by pinching the metal of the stem and the diameter of the passage 20 is so chosen as to engage these wings and displace the stem lengthwise.

When the valve is closed as shown in Fig. 1 the head 17 is seated flat upon the upper face of the washer, this flat relation being preserved at all times regardless of the fluid pressure, by reason of the fact that the diameter of the head is greater than that of the bore 11. The height of the chamber 6 and the thickness of the head 17 are so chosen that when the valve is opened as shown in Fig. 2 the flange 18 presses upon the bottom of the washer only gently and preferably not enough to deflect it more than a barely observable amount. This enables the air pressure acting upon the top of the washer to force it into tight sealing relation with the upper face of the flange 18, thus preventing leakage outside of the tire valve, while the engagement of the tire valve with the nipple 19 and flange 18 prevents the occurrence of any appreciable leakage at this point. The raising of the head 17 from the washer permits access of air to the port 21 and thence to the tire valve. No deformaton of the packing in excess of that described can occur since the movement of the valve is arrested by the engagement of the head 17 with the top of the chamber and no force which the operator can exert will injure the parts. Owing to the rounding shape of the head 17 the valve can tilt sidewise a small amount if necessary to align itself with the tire valve as the bore 11 becomes worn.

In Fig. 5 I have shown a slightly modified construction wherein the bore 11$^a$ is formed directly in the head 1$^a$, the same soft washer 8 being used but its recess 5$^a$ opening in the opposite direction. The top of the chamber is closed by a plug 30, a serrated washer 31 or other suitable expedient being employed to afford the necessary clamping of the soft washer without impairing communication between the chamber and the passage 7. In this case I have shown the plug as formed with a rounded boss 32 to engage the flat or concave valve head.

It will be noted that the entering member makes only a metal to metal contact and does not engage any soft or wearable portion, and the ability to produce a leak-proof valve in this way is an important feature of my invention; but another important feature is the formation of a valve wherein the same soft packing seals against leakage at both sides and without any substantial flexing. It will be understood that either of these features can be used without the other and that many changes in detail can be made in the design and construction without departing from my inventive idea.

Having thus described my invention what I claim is:

1. An inflating valve for tires comprising a chambered head having a bore adapted to receive slidably the end portion of a valve stem, a soft washer inside said head and having an aperture registering with said bore, and a one piece, all metal valve member having a shank traversing said aperture, a head overlying said washer and a flange underlying said washer, said shank having a length between said head and said flange exceeding the thickness of said washer by approximately the distance between the head and chamber wall when the valve is closed, and having a passageway therein, said head being larger than said bore and said flange being smaller than said bore and slidable therein.

2. An inflating valve for tires comprising a chambered head having a bore adapted to receive slidably the end portion of a valve stem, a soft washer inside said head and having an aperture registering with said bore, and a one piece, all metal valve member having a shank traversing said aperture, a head overlying said washer and a flange underlying said washer, said head being larger than said bore so as to overlie the same when closed and said flange being larger than said aperture so as to engage the washer when the valve is opened, said flange being smaller than said bore and slidable therein and adapted to be seated directly on the end of a tire valve, the parts being so designed that the valve head engages the chamber top substantially at the same time that said flange engages said washer, said shank having an air passage therein.

3. In an inflating valve for tires, in combination, a chambered head having a bore adapted to receive slidably the end portion of a valve stem, a soft, flat washer in said head and having an aperture registering with said bore, and a one-piece, all-metal valve member having a shank traversing said aperture, a head overlying said washer and a flange underlying said washer, said shank having therein a longitudinal passage and a lateral port, the exterior diameter of said shank being less than that of said aperture, and the diameter of said head being greater than that of said bore, said flange being smaller than said bore and slidable therein, and said shank having an extension beyond said flange adapted to enter the end of said valve stem to permit said flange to be seated upon the top of said stem, the distance between said valve head and the adjacent wall of the chamber being such as to cause contact therebetween substantially at the same time that said flange engages said washer.

In testimony whereof, I hereunto affix my signature.

FRED E. HANSEN.